US012736446B2

(12) United States Patent
Jo et al.

(10) Patent No.: US 12,736,446 B2
(45) Date of Patent: Sep. 15, 2026

(54) APPARATUS FOR MANUFACTURING ANALYTICAL SEMICONDUCTOR SAMPLES AND METHOD FOR MANUFACTURING ANALYTICAL SEMICONDUCTOR SAMPLES BY USING THE SAME

(71) Applicant: Samsung Electronics Co., Ltd., Suwon-si (KR)

(72) Inventors: Min Chul Jo, Suwon-si (KR); Sang Hyun Park, Suwon-si (KR); Su Jin Shin, Suwon-si (KR); Gil Ho Gu, Suwon-si (KR); Dae Gon Yu, Suwon-si (KR); So Yeon Lee, Suwon-si (KR); Yun Bin Jeong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 499 days.

(21) Appl. No.: 18/454,381

(22) Filed: Aug. 23, 2023

(65) Prior Publication Data

US 2024/0085282 A1 Mar. 14, 2024

(30) Foreign Application Priority Data

Sep. 8, 2022 (KR) ........................ 10-2022-0114398

(51) Int. Cl.
*G01N 1/32* (2006.01)
*B24B 7/22* (2006.01)

(52) U.S. Cl.
CPC ............... *G01N 1/32* (2013.01); *B24B 7/228* (2013.01)

(58) Field of Classification Search
CPC .......... B24B 7/228; B24B 49/12; G01N 1/32; G01N 1/36; G01N 23/2202; G01N 23/2204; G01N 23/2251
See application file for complete search history.

(56) References Cited

U.S. PATENT DOCUMENTS

| | | | |
|---|---|---|---|
| 9,815,170 | B2 | 11/2017 | Eryu et al. |
| 2019/0247975 | A1 | 8/2019 | Omori et al. |

FOREIGN PATENT DOCUMENTS

| | | | | |
|---|---|---|---|---|
| EP | 1605499 A2 * | 12/2005 | .......... | H10P 14/3806 |
| JP | 2004501370 A * | 1/2004 | .......... | H01J 37/3053 |

(Continued)

*Primary Examiner* — C. A. Rivera
(74) *Attorney, Agent, or Firm* — Harness, Dickey & Pierce, P.L.C.

(57) ABSTRACT

There is provide a method for manufacturing analytical semiconductor samples by using an apparatus for manufacturing analytical semiconductor samples, which minimizes a feedback time by manufacturing a viewing surface that is environment-friendly and has a large area. The method comprising mounting the analytical semiconductor samples to a holder; discharging deionized (DI) water to an upper surface of a polishing plate through a DI water nozzle; grinding the analytical semiconductor samples with the upper surface of the polishing plat; determining whether a desired viewing surface of the analytical semiconductor samples has been acquired after the grinding of the analytical semiconductor samples; and transferring the analytical semiconductor samples to analyze the viewing surface of the ground analytical semiconductor samples based on a determination that the desired viewing surface of the analytical semiconductor samples has been acquired.

6 Claims, 12 Drawing Sheets

(56) References Cited

FOREIGN PATENT DOCUMENTS

| | | | | |
|---|---|---|---|---|
| KR | 10-1999-0021448 | U | 3/1999 | |
| KR | 10-1999-0020320 | U | 6/1999 | |
| KR | 100552560 | B1 | 2/2006 | |
| KR | 10-2006-0089109 | A | 8/2006 | |
| KR | 101783406 | B1 | 10/2017 | |
| KR | 10-2019-0135449 | A | 12/2019 | |
| KR | 102053651 | B1 | 12/2019 | |
| KR | 10-2022-0043424 | A | 4/2022 | |
| KR | 10-2022-0055036 | A | 5/2022 | |
| WO | WO-2008133656 | A2 * | 11/2008 | ......... G01N 27/3278 |

* cited by examiner

APPARATUS FOR MANUFACTURING ANALYTICAL SEMICONDUCTOR SAMPLES AND METHOD FOR MANUFACTURING ANALYTICAL SEMICONDUCTOR SAMPLES BY USING THE SAME

CROSS-REFERENCE TO RELATED APPLICATION

This application claims priority from Korean Patent Application No. 10-2022-0114398 filed on Sep. 8, 2022 in the Korean Intellectual Property Office and all the benefits accruing therefrom under 35 U.S.C. 119, the contents of which in its entirety are herein incorporated by reference.

BACKGROUND

1. Technical Field

The present disclosure relates to an apparatus for manufacturing analytical semiconductor samples and a method for manufacturing analytical semiconductor samples by using the same.

2. Description of the Related Art

Various analytical techniques such as scanning electron microscopy (SEM) and transmission electron microscopy (TEM) have been used as conventional analytical techniques for semiconductor samples to analyze the samples by dividing a view direction into a top view, a vertical view, and an angle view. For example, in the conventional analytical techniques, a process of preparing samples is required for SEM analysis, and is generally performed in the order of 1) collecting of piece samples, 2) surface processing, 3) post-treatment, and 4) analysis. The surface processing is the most important step in the process of making a viewing surface for analysis, and its development has been continuously researched.

In case of a conventional semiconductor process having a unit process of several micrometers (μm), even though the degree of a surface roughness has several μm or hundreds of nanometers (nm), there is generally not a significant problem in manufacturing or analyzing samples. However, as the demand for smaller devices for greater integration, the demand for the analysis of structures of several nanometers (nm) scale is increasing due to extreme refinement in recent processes, and elaboration of a sample treatment method is being researched.

Accordingly, viewing surfaces manufactured through a focused ion beam (FIB) method using Ion Beam and chemical mechanical polishing (CMP), unlike another conventional case in which a viewing surface for analysis is made through mechanical polishing using sandpaper, have been explored.

However, in case of the FIB method, it is disadvantageous to make a wide viewing surface due to a beam size (which is often of a scale of μm), and there is great limitation in a working time and a working environment due to any work also requiring a vacuum chamber. The CMP method has an advantage in that it is possible to view a wide surface, but has a problem in view of an environment-friendly concerns because a chemical slurry is used.

In a recent environment in which elaboration is enhanced and an area of a structure to be viewed is increased, therefore, using these methods, a manufacturing time is exponentially increased, and several hours may be required to manufacture one analytical semiconductor sample. This leads to an increase in an analysis feedback time, resulting in a decrease in process capability. Therefore, a new method for manufacturing analytical semiconductor samples to improve process capability has been explored.

SUMMARY

Aspects related to various example embodiments of the present disclosure provide an apparatus for manufacturing analytical semiconductor samples and minimize a feedback time by manufacturing a viewing surface that is environment-friendly and has a large area.

Aspects related to various example embodiments of the present disclosure provide a method for manufacturing analytical semiconductor samples by using an apparatus for manufacturing analytical semiconductor samples, which minimizes a feedback time by manufacturing a viewing surface, which is environment-friendly and has a large area.

Aspects related to various example embodiments of the present disclosure are not limited to those mentioned above and additional objects of the present disclosure, which are not mentioned herein, will be clearly understood by those skilled in the art from the following description of the present disclosure.

According to some embodiments of the present disclosure, there is provided a method for manufacturing analytical semiconductor samples, the method comprising mounting the analytical semiconductor samples to a holder; rotating, through a rotatable support, a polishing plate for a determined duration; discharging deionized (DI) water to an upper surface of the polishing plate through a DI water nozzle; grinding the analytical semiconductor samples with the upper surface of the polishing plate during the rotating; determining whether a desired viewing surface of the analytical semiconductor samples, with respect to a viewing surface image of the ground analytical semiconductor samples, has been acquired after the grinding of the analytical semiconductor samples; determining a change of at least one of a tilt direction or a tilt angle based on a determination that the desired viewing surface of the analytical semiconductor samples has not been acquired; grinding the analytical semiconductor samples using the changed at least one of the tilt direction or the tilt angle; and transferring the analytical semiconductor samples to analyze the viewing surface of the ground analytical semiconductor samples based on a determination that the desired viewing surface of the analytical semiconductor samples has been acquired.

According to some embodiments of the present disclosure, there is provided an apparatus for manufacturing analytical semiconductor samples, the apparatus comprising a rotatable support comprising a metal material and having a disk-shaped upper surface; a polishing plate mounted on an upper surface of the rotatable support; a deionized (DI) water nozzle above a first side of the polishing plate; a holder configured to mount the analytical semiconductor samples, the holder positioned above a second side of the polishing plate; a displacement sensor above the holder; a camera above the second side of the polishing plate such that the camera is in proximity to the holder; and an electronic controller configured to communicate with the rotatable support, the DI water nozzle, the holder, the displacement sensor, and the camera.

According to some embodiments of the present disclosure, there is provided an apparatus for manufacturing analytical semiconductor samples, the apparatus comprising a rotatable support comprising of a metal material and having a disk-shaped upper surface; a polishing plate mounted on an upper surface of the rotatable support; a first deionized (DI) water nozzle above a first side of the polishing plate; a second DI water nozzle above a second side of the polishing plate; a holder configured to hold the analytical semiconductor samples, the holder positioned above the second side of the polishing plate; a displacement sensor above the holder; a camera above the second side the polishing plate such that the camera is in in proximity to the holder; and an electronic controller configured to communicate with to the rotatable support, the first DI water nozzle, the second DI water nozzle, the holder, the displacement sensor, and the camera, wherein the holder includes a support frame fixed to one side of the analytical semiconductor samples; a rotary body coupled to the support frame; a first link rotatably mounted to the rotary body; a second link rotatably mounted to a first end of the first link; a third link rotatably mounted to a first end of the second link; a clamp driver mounted on to a first end of the third link; a first clamp terminal mounted to an end of the clamp driver; and a second clamp terminal mounted to an end of a linear shaft configured to pass through the clamp driver and the first clamp terminal.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE DISCLOSURE

Objects, specific advantages, and new features of the present disclosure will be clarified from the following detailed description and preferred embodiments, which are associated with the accompanying drawings. Wherever possible, the same reference numbers will be used throughout the drawings to refer to the same or like elements. It will be understood that although the terms such as first, second, etc., may be used herein to describe various elements, these elements should not be limited by these terms. These terms are generally only used to distinguish one element from another element. Also, in the description of the present disclosure, when the detailed description of the relevant known art is determined to unnecessarily obscure the subject matter of the present disclosure, the detailed description will be omitted.

Hereinafter, some example embodiments of the present disclosure will be described in detail with reference to the accompanying drawings.

Figure 1:
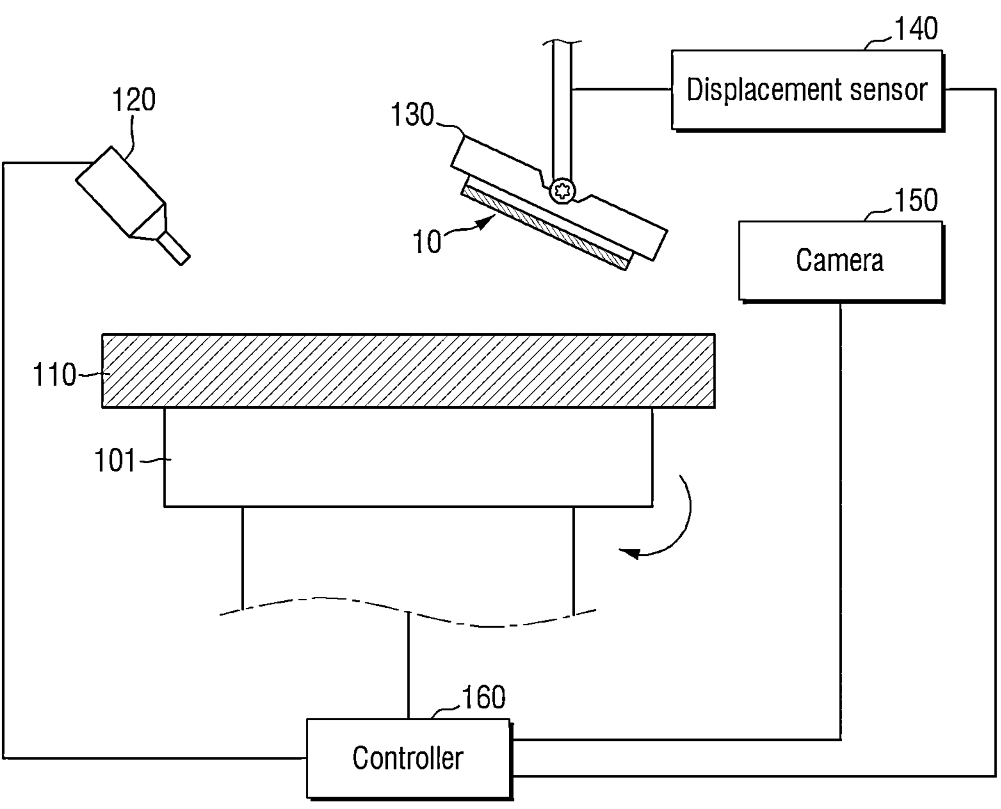
FIG. 1 is a schematic view illustrating an apparatus for manufacturing analytical semiconductor samples according to the first embodiment of the present disclosure.
Figure 2:
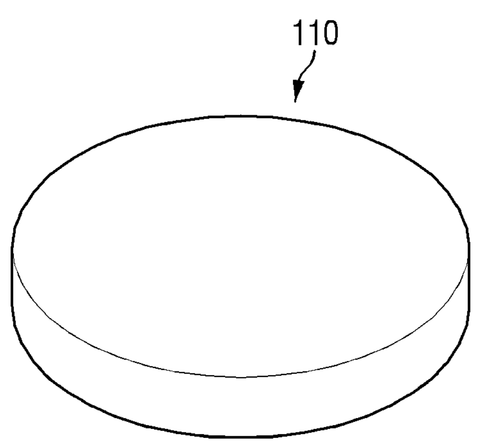
FIG. 2 is a perspective view illustrating a polishing plate constituting an apparatus for manufacturing analytical semiconductor samples according to the first embodiment of the present disclosure.
Figure 3:
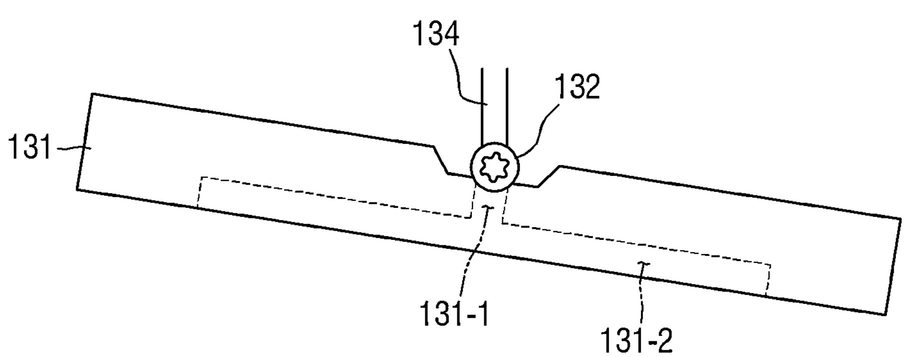
FIG. 3 is a side view illustrating a holder constituting an apparatus for manufacturing analytical semiconductor samples according to the first embodiment of the present disclosure.
Figure 4:
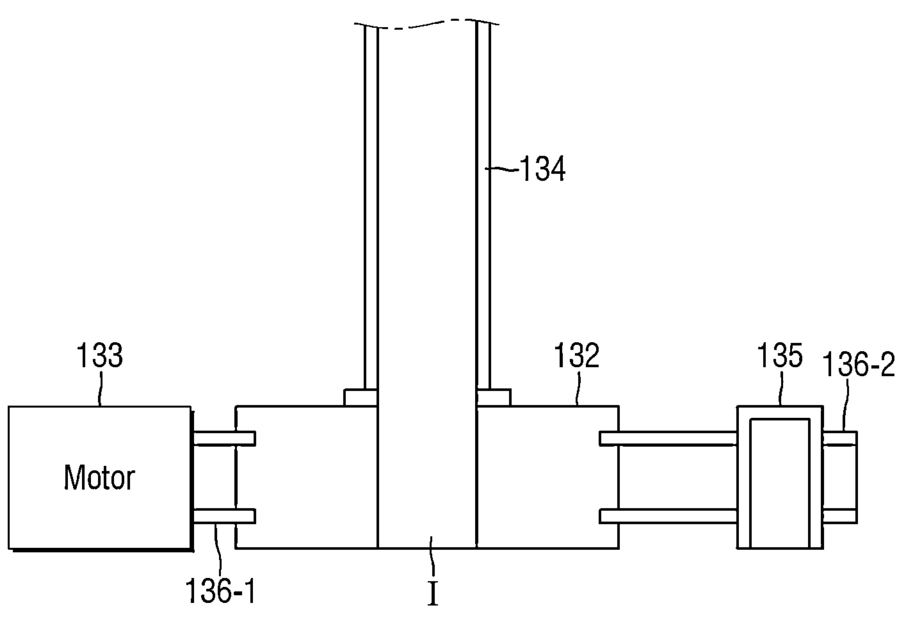
FIG. 4 is a cross-sectional view illustrating a hinge connector constituting the holder shown in FIG. 3.
Figure 5:
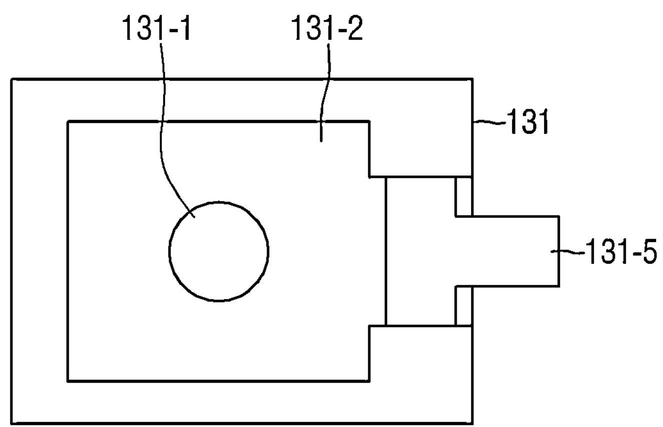
FIG. 5 is a rear view illustrating the holder shown in FIG. 3.
Figure 6:
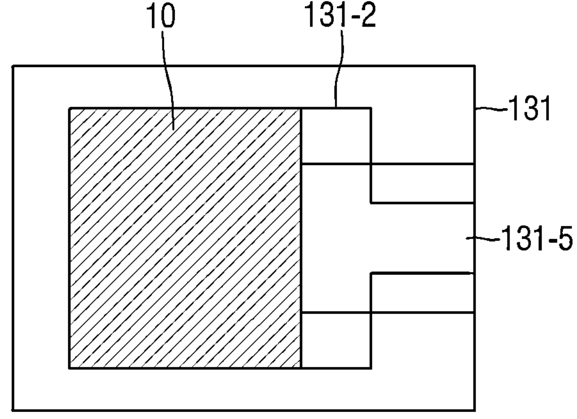
FIG. 6 is an example view illustrating analytical semiconductor samples mounted on the holder shown in FIG. 5.

FIG. 1 is a schematic view illustrating an apparatus for manufacturing analytical semiconductor samples according to the first embodiment of the present disclosure, FIG. 2 is a perspective view illustrating a polishing plate constituting an apparatus for manufacturing analytical semiconductor samples according to the first embodiment of the present disclosure, FIG. 3 is a side view illustrating a holder constituting an apparatus for manufacturing analytical semiconductor samples according to the first embodiment of the present disclosure, FIG. 4 is a cross-sectional view illustrating a hinge connector constituting the holder shown in FIG. 3, FIG. 5 is a rear view illustrating the holder shown in FIG. 3, and FIG. 6 is an example view illustrating that analytical semiconductor samples are mounted on the holder shown in FIG. 5.

As shown in FIG. 1, the apparatus for manufacturing analytical semiconductor samples according to the first embodiment of the present disclosure includes a rotatable support 101, a polishing plate 110 mounted on an upper surface of the rotatable support 101, a deionized (DI) water nozzle 120 positioned at one side above the polishing plate 110, a holder 130 holding the analytical semiconductor samples 10, positioned at the other side above the polishing plate 110, a displacement sensor 140 provided above the holder 130, a camera 150 provided at the other side above the polishing plate 110 in proximity to the holder 130, and a controller 160 connected to the rotatable support 101, the DI water nozzle 120, the holder 130, the displacement sensor 140 and the camera 150.

According to at least some examples, the rotatable support 101 is formed of a metal material, has a disk-shaped upper surface, and has a structure rotatable by a lower motor (not shown) under the control of the controller 160 according to command information of a user and/or instructions from the controller 160.

The polishing plate 110 has a circular disk shape as shown in FIG. 2 and is configured to be attached to and/or detached from the upper surface of the rotatable support 101.

In at least some examples, the polishing plate 110 is formed using of at least one of an amorphous material, a monocrystalline material, and/or a metal material. The amorphous material includes, e.g., amorphous $SiO_2$ as an amorphous silicon compound, and the monocrystalline material includes, e.g., aluminum oxide (for example, $Al_2O_3$ and/or the like). In at least some examples, a sapphire substrate is used, and the metal material includes, e.g., stainless steel and/or tempered aluminum.

The polishing plate 110 may have a diameter of 100 mm to 300 mm, (e.g., 150 mm to 200 mm), and may have a thickness of 100 μm to 5 mm (e.g., 2 mm to 3 mm).

According to at least some examples, the polishing plate 110 has a surface roughness in the range of 0.01 μm to 5 μm, and/or in the range of 0.01 μm to 0.1 μm.

According to at least some examples, the polishing plate 110 has a surface Mohs hardness in the range of 6.5 to 9.5, and/or in the range of 7.5 to 9.5. The surface hardness may be in the range of 20 gigapascal (Gpa) to 45 Gpa as a hardness value range converted by a Vickers test method.

The DI water nozzle 120 is positioned above one side of the polishing plate 110, is connected to an external DI water tank (not shown), and discharges DI water to an upper surface of the polishing plate 110 under the control of the controller 160. The DI water nozzle 120 is inclined at a predetermined (and/or otherwise determined) angle with respect to the upper surface of the polishing plate 110 so that a nozzle pipe of the DI water nozzle 120 may be provided toward the upper surface of the polishing plate 110.

According to some examples, the DI water nozzle 120 discharges the DI water to one side of the upper surface of the rotating polishing plate 110 under the control of the controller 160, thereby lubricating a process of grinding, using the upper surface of the polishing plate 110, in order to acquire a viewing surface of the analytical semiconductor samples 10.

The holder 130 mounts the analytical semiconductor samples 10 on a lower portion, is positioned above the polishing plate 110, and may move to be in contact with the upper surface of the polishing plate 110 at a predetermined (and/or otherwise determined) angle. The holder 130 is configured to hold the analytical semiconductor samples 10 in relation to the polishing plate 110. For example, according to at least some examples, the holder 130 may be configured to vacuum-adsorb the analytic semiconductor samples 10 mounted on the lower portion under the control of the controller 160.

According to some examples, the holder 130 may include a holder housing 131 of a rectangular cross-section formed of a metal material, a rotary connector 132 connected to and mounted on an upper portion of the holder housing 131, a motor 133 connected to one side of the rotary connector 132 by a first rotary shaft 136-1, a fixed portion 135 connected to the other side of the rotary connector 132 by a second rotary shaft 136-2 and fixedly mounted on the upper surface of the holder housing 131, and a vacuum suction pipe 134 connected to an upper portion of the rotary connector 132 and connected to an external vacuum pump (not shown) while moving up and down. According to at least some embodiments, the fixed portion 135 may be, e.g., a fastener such as a nut, washer, flange, etc.

As shown in FIGS. 3 and 5, the holder housing 131 may include a rectangular groove 131-2 having a rectangular cross-section formed of a metal material and mounting the analytical semiconductor samples 10 on a lower surface, and a vacuum hole 131-1 communicated with the vacuum suction pipe 134 at the center of the rectangular groove 131-2, and also includes a push member 131-5 sliding along a line groove opened at one side of the rectangular groove 131-2.

In the holder housing 131, the push member 131-5 has a thickness equal to or smaller than a depth of the rectangular groove 131-2, and its surface oriented toward the inside of the rectangular groove 131-2 is formed of a rubber material, for example, and slides along a line groove opened at one side of the square groove 131-2.

Therefore, as shown in FIG. 6, the push member 131-5 may rigidly support the analytical semiconductor samples 10 mounted on the rectangular groove 131-2 by pushing the analytical semiconductor samples 10 toward the surface formed of a rubber material. In addition, the push member 131-5 may maintain an adsorbed state by sealing the vacuum-adsorbing of the analytical semiconductor samples 10 through the vacuum hole 131-1 communicated with the vacuum suction pipe 134.

The push member 131-5 may have a height smaller than a depth of the rectangular groove 131-2 such that only the analytical semiconductor samples 10 may protrude from the lower surface of the holder housing 131.

The rotary connector 132 is connected to and mounted on the upper portion of the holder housing 131, is partially inserted into the upper portion of the holder housing 131 in a cylindrical shape as shown in FIG. 4, has a vacuum passage I connected to the vacuum suction pipe 134 inside the center. The vacuum passage I is communicated with the vacuum hole 131-1 provided at the center of the rectangular groove 131-2, and thereby is configured to create a vacuum for the vacuum-adsorbing of the analytical semiconductor samples 10.

The rotary connector 132 may rotate as the motor 133 connected to one side by the first rotary shaft 136-1 operates under the control of the controller 160, thereby tilting the holder housing 131 at a predetermined (and/or otherwise determined) angle by the fixing portion 135 connected to the other side by the second rotary shaft 136-2.

Therefore, the analytical semiconductor samples 10 mounted on the lower surface of the holder housing 131 may be prepared to be tilted at a predetermined (and/or otherwise determined) angle.

The displacement sensor 140 is provided above the holder 130 and/or in proximity to the holder 130 and is configured to sense the degree of movement of the holder housing 131 of the holder 130 in, e.g., an up and down direction. For example, the displacement sensor 140 may be considered to be in proximity to the holder 130 when disposed at a distance and/or position wherein the displacement sensor 140 can interact with and/or observe the holder 130 without interference and/or obstruction by other elements.

According to at least some examples, the displacement sensor 140 includes a contact type displacement sensor provided in contact with the upper side of the holder 130 or a laser displacement sensor provided to detect displacement by irradiating a laser beam to the holder housing 131 in proximity to the holder 130.

The camera 150 is provided above the polishing plate 110 in proximity to the holder 130, and is configured to capture a state of the analytical semiconductor samples 10 mounted on the lower surface of the holder housing 131 during the grounding on the upper surface of the polishing plate 110, in real time, and to transfer the captured state to the controller 160. For example, the camera 150 may be considered to be in proximity to the holder 130 when disposed at a distance and/or position wherein the camera 150 can observe the holder 130 without interference and/or obstruction by other elements. According to at least some examples, the camera 150 includes, for example, a Charge-Coupled Device (CCD) camera.

The controller 160 is connected to, and/or in communication with, the rotatable support 101, the DI water nozzle 120, the holder 130, the displacement sensor 140, the camera 150, etc., as shown in FIG. 1, controls movement of the holder housing 131, on which the analytical semiconductor samples 10 are mounted, to the upper surface of the polishing plate 110 in accordance with command information, the rotation of the rotatable support 101 with a predetermined (and/or otherwise determined) number of rotation, and the discharge of the DI water through the DI water nozzle 120 to process grinding of the analytical semiconductor samples 10. The controller 160 may also be referred to as an electronic controller, and may include processing circuitry, such as hardware, software, or a combination of hardware and software. For example, the processing circuitry more specifically may be and/or include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), electrical components (such as at least one of transistors, resistors, capacitors, logic gates (including at least one of AND gates, OR gates, NOR gates, NAND gates, NOT gates, XOR gates, etc.), and/or the like), etc.

Additionally, the controller 160 may check the state of the analytical semiconductor samples 10 ground on the upper surface of the polishing plate 110, through the camera 150 in real time, and may control a display of an image obtained by capturing the surface of the ground analytical semiconductor samples 10 to the user.

In the apparatus for manufacturing analytical semiconductor samples according to the first embodiment of the present disclosure configured as above, the analytical semiconductor samples 10 may be mounted in a planar shape and may widely manufacture the viewing surface of the analytical semiconductor samples 10 by using the DI water unlike the conventional focused ion beam (FIB) method and the conventional chemical mechanical polishing (CMP) method.

Particularly, the apparatus for manufacturing analytical semiconductor samples according to the first embodiment of the present disclosure may widely manufacture the viewing surface of the analytical semiconductor samples 10 by discharging the DI water through the DI water nozzle 120 differently from the conventional CMP method using less environmentally friendly chemicals. As such, the apparatus for manufacturing analytical semiconductor samples according to the first embodiment of the present disclosure may form the viewing surface through a mechanism that is environment-friendly and which has a large area that may be manufactured to minimize a feedback time.

Figure 7:
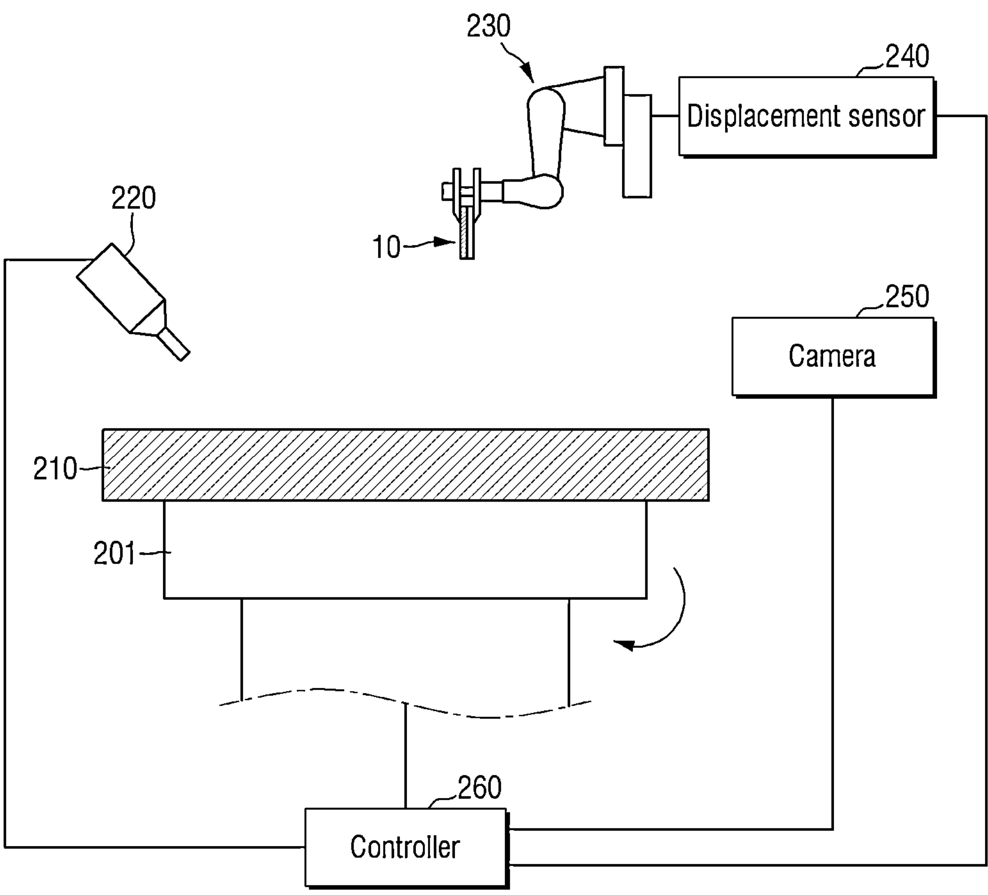
FIG. 7 is a schematic view illustrating an apparatus for manufacturing analytical semiconductor samples according to the second embodiment of the present disclosure.
Figure 8:
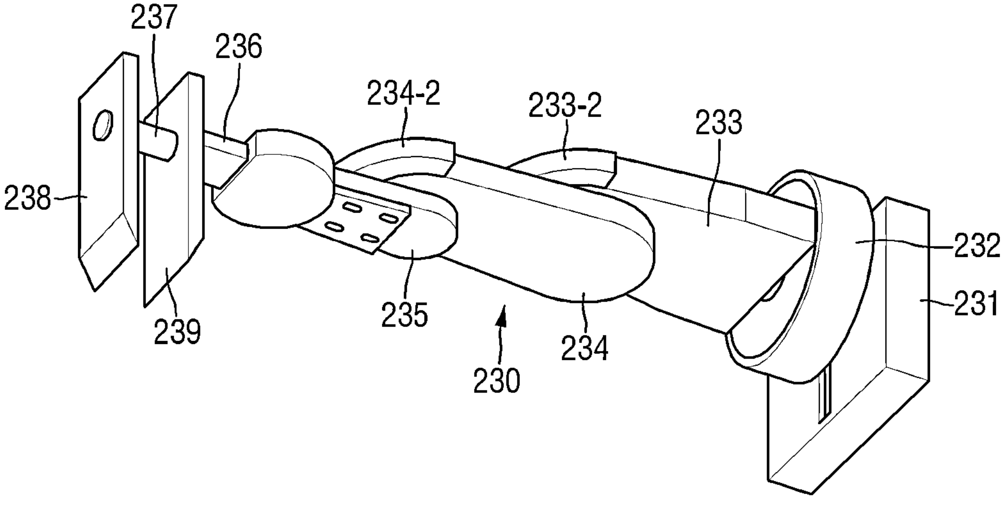
FIG. 8 is a perspective view illustrating a holder constituting an apparatus for manufacturing analytical semiconductor samples according to the second embodiment of the present disclosure.
Figure 9:
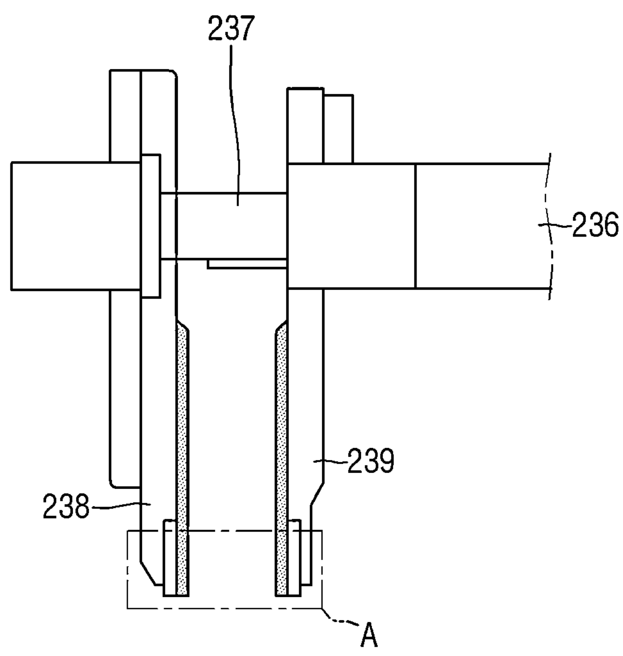
FIG. 9 is a cross-sectional view illustrating an end portion of the holder shown in FIG. 8.
Figure 10:
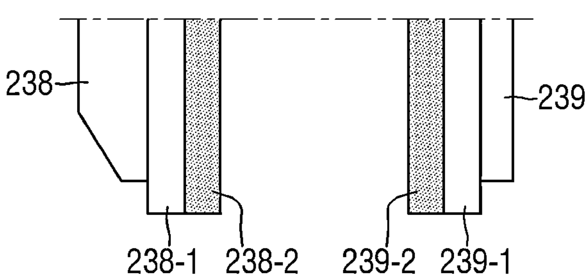
FIG. 10 is an enlarged view illustrating a portion A of FIG. 9.
Figure 11:
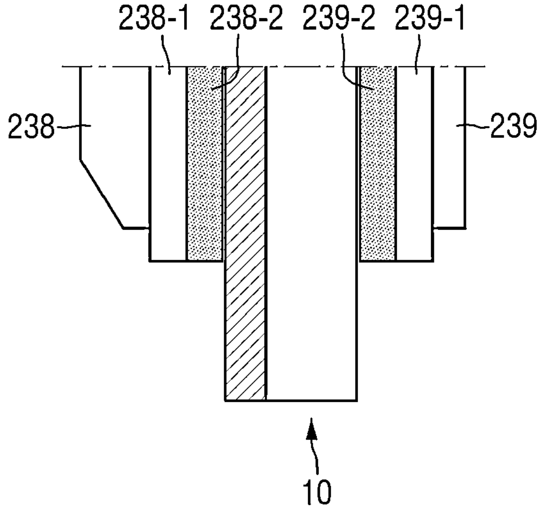
FIG. 11 is an example view illustrating analytical semiconductor samples mounted on the end portion of the holder shown in FIG. 8.

Hereinafter, an apparatus for manufacturing analytical semiconductor samples according to the second embodiment of the present disclosure will be described with reference to FIGS. 7 to 11. FIG. 7 is a schematic view illustrating an apparatus for manufacturing analytical semiconductor samples according to the second embodiment of the present disclosure, FIG. 8 is a perspective view illustrating a holder constituting an apparatus for manufacturing analytical semiconductor samples according to the second embodiment of the present disclosure, FIG. 9 is a cross-sectional view illustrating an end portion of the holder shown in FIG. 8, FIG. 10 is an enlarged view illustrating a portion A of FIG. 9, and FIG. 11 is an example view illustrating that analytical semiconductor samples are mounted on the end portion of the holder shown in FIG. 8.

As shown in FIG. 7, the apparatus for manufacturing analytical semiconductor samples according to the second embodiment of the present disclosure includes a rotatable support 201, a polishing plate 210 mounted on an upper surface of the rotatable support 201, a deionized (DI) water nozzle 220 positioned above the polishing plate 210, a holder 230 configured to hold analytical semiconductor samples 10 and positioned above the polishing plate 210, a displacement sensor 240 provided above the holder 230, a camera 250 provided above the polishing plate 210 in proximity to the holder 230, and a controller 260 connected to the rotatable support 201, the DI water nozzle 220, the holder 230, the displacement sensor 240 and the camera 250.

The rotatable support 201 may be the same as, and/or substantially similar to, the rotatable support 101 of FIG. 1. For example, according to at least some examples, the rotatable support 201 is formed of a metal material, has a disk-shaped upper surface, and has a structure rotatable by a lower motor (not shown) under the control of the controller 260 according to command information of a user.

The polishing plate 210 may be the same as, and/or substantially similar to, the polishing plate 110 of FIG. 1. For example, according to some examples, the polishing plate 210 has a circular disk shape in the same manner as shown in FIG. 2 and is attached to and detached from the upper surface of the rotatable support 201.

In at least some examples, the polishing plate 210 is formed using of at least one of an amorphous material, a monocrystalline material, and/or a metal material. The amorphous material includes, e.g., amorphous $SiO_2$ as an amorphous silicon compound, and the monocrystalline material includes, e.g., aluminum oxide (for example, $Al_2O_3$ and/or the like). In at least some examples, a sapphire substrate is used, and the metal material includes, e.g., stainless steel and/or tempered aluminum.

The polishing plate 210 may have a diameter of 100 mm to 300 mm, (e.g., 150 mm to 200 mm), and may have a thickness of 100 μm to 5 mm (e.g., preferably 2 mm to 3 mm).

According to at least some examples, the polishing plate 210 has a surface roughness in the range of 0.01 μm to 5 μm, and/or in the range of 0.01 μm to 0.1 μm.

According to at least some examples, the polishing plate 210 has a surface Mohs hardness in the range of 6.5 to 9.5, and/or in the range of 7.5 to 9.5. The surface hardness may be in the range of 20 Gpa to 45 Gpa as a hardness value range converted by a Vickers test method.

The DI water nozzle 220 may be the same as, and/or substantially similar to, the DI water nozzle of FIG. 1. For example, according to at least some examples, the DI water nozzle 220 is positioned at one side above the polishing plate 210, is connected to an external DI water tank (not shown), and discharges DI water to one side of an upper surface of the polishing plate 210 under the control of the controller 260. The DI water nozzle 220 is inclined at a predetermined (and/or otherwise determined) angle with respect to the upper surface of the polishing plate 210 so that a nozzle pipe of the DI water nozzle 220 may be provided toward the upper surface of the polishing plate 210.

According to some examples, the DI water nozzle 220 discharges the DI water to one side of the upper surface of the rotating polishing plate 210 under the control of the controller 260, thereby lubricating a process of grinding the upper surface of the polishing plate 210 in order to acquire a viewing surface of the analytical semiconductor samples 10.

According to at least some embodiments, the holder 230 holds the analytical semiconductor samples 10 on an end portion, is positioned above the polishing plate 210, and may move the analytical semiconductor samples 10 to be in contact with the upper surface of the polishing plate 210 at a predetermined (and/or otherwise determined) angle while clamping the analytic semiconductor samples 10 mounted on the end portion under the control of the controller 260.

For example, as shown in FIG. 8, the holder 230 includes a support frame 231 fixed to one side of the apparatus for manufacturing analytical semiconductor samples, a rotary body 232 coupled to the support frame 231, a first link 233 rotatably mounted on one surface of the rotatory body 232, a second link 234 rotatably mounted on an end of the first link 233, a third link 235 rotatably mounted on an end of the second link 234, a clamp driver 236 mounted on an end of the third link 235, a first clamp terminal 239 mounted on an end of the clamp driver 236, and a second clamp terminal 238 provided at an end of a linear shaft 237 provided to pass through the clamp driver 236 and the first clamp terminal 239. Though three links 233, 234, and 235 are illustrated, the examples are not limited thereto, and the holder 230 may include fewer or more links.

The support frame 231 is fixedly mounted on one side of the apparatus for manufacturing analytical semiconductor samples and is in configured to communicate with the controller 260. The support frame 231 supports the rotary body 232 and the plurality of links 233, 234 and 235.

The rotary body 232 is a disk-shaped structure formed of, e.g., a metal material and coupled to a front surface of the support frame 231 and includes a rotary shaft and a motor therein to rotate the first link 233 at a predetermined (and/or otherwise determined) angle under the control of the controller 260.

The first link 233 is a flat panel member formed of a metal material and rotatably mounted on one surface of the rotary body 232. One side of the first link 233 is rotatably connected to the rotary shaft of the rotary body 232, and the other side end thereof has an arc shape and includes a rotary shaft there-below. A first guide 233-2 of an arc shape is provided at the other side end of the first link 233. The first guide 233-2 may be formed of, for example, an electromagnet.

The second link 234 is a flat panel member that is formed of, e.g., a metal material, has one side connected to and spaced apart from the rotary shaft provided on a lower surface of the other side end of the first link 233 and is rotatably mounted on the rotary shaft. An upper surface of one side of the second link 234 is rotatably connected to the rotary shaft provided on the lower surface of the other side end of the first link 233, and the other side end of the second link 234 has an arc shape and includes a rotary shaft there-below. A second guide 234-2 of an arc shape is provided at the other side end of the second link 234. The second guide 234-2 may be formed of, for example, an electromagnet.

The third link 235 is a structure that is formed of, e.g., a metal material, has one side connected to and spaced apart from the rotary shaft provided on a lower surface of the other side end of the second link 234 and is rotatably mounted on the rotary shaft. An upper surface of one side of the third link 235 is rotatably connected to the rotary shaft provided on the lower surface of the other side end of the second link 234, and the other side end of the third link 235 includes the clamp driver 236.

The clamp driver 236 has a first clamp terminal 239 mounted on an end thereof as shown in FIG. 9, includes a linear motor therein, is provided to pass through a linear shaft 237 connected to the linear motor and moves the linear shaft 237 in an axial direction under the control of the controller 260.

The second clamp terminal 238 is provided at an end of the linear shaft 237 and may be in contact with the first clamp terminal 239 in accordance with movement of the linear shaft 237 to perform a clamping operation.

Each of the first clamp terminal 239 and the second clamp terminal 238 has a flat panel structure that is formed of, e.g., a metal material to clamp the analytical semiconductor samples 10. As shown in FIG. 10, the first clamp terminal 239 and the second clamp terminal 238 include support plates 238-1 and 239-1 made of, e.g., a metal material on a clamping surface and elastic bodies 238-2 and 239-2 formed of elastic materials (such as polymer and/or rubber materials) on surfaces of the support plates 238-1 and 239-1.

The first clamp terminal 239 and the second clamp terminal 238 perform a clamping operation while the linear axis 237 is being contracted by the clamp driver 236 so that the second clamp terminal 238 moves to the first clamp terminal 239 and clamps the analytical semiconductor samples 10 between the elastic bodies 238-2 and 239-2 as shown in FIG. 11.

Also, each of the first clamp terminal 239 and the second clamp terminal 238 may selectively include a distance detection sensor (not shown) on an upper side based on the linear shaft 237 to sense an interval between the first clamp terminal 239 and the second clamp terminal 238, and the controller 260 may check the clamping state of the analytical semiconductor samples 10.

The holder 230 configured as described above operates the rotary body 232 and the plurality of links 233, 234 and 235 under the control of the controller 260 in a state that the analytical semiconductor samples 10 are clamped between the first clamp terminal 239 and the second clamp terminal 238 to tilt the analytical semiconductor samples 10 at a predetermined (and/or otherwise determined) angle, thereby allowing the analytical semiconductor samples 10 to be in contact with the upper surface of the polishing plate 210.

According to at least some examples, the displacement sensor 240 may be substantially similar to the displacement sensor 140. For example, the displacement sensor 240 is provided above the holder 230 or is provided in proximity to the holder 230 so as to sense the degree of movement of the clamp driver 236 of the holder 130 in an up and down direction.

The displacement sensor 240 may include a contact type displacement sensor provided in contact with the upper side of the holder 230 or a laser displacement sensor provided to detect displacement by irradiating a laser beam to the clamp driver 236 of the holder 230 in proximity to the holder 230.

The camera 250 may be the same as, and/or substantially similar to the camera 150. For example, according to at least some examples, the camera 250 may be provided at the other side above the polishing plate 210 in proximity to the holder 230, and configured to capture a state of the analytical semiconductor samples 10 clamped between the first clamp terminal 239 and the second clamp terminal 238 during the grounding on the upper surface of the polishing plate 210, in real time, and to transfer the captured state to the controller 260. According to at least some examples, the camera 250 includes, for example, a Charge-Coupled Device (CCD) camera.

The controller 260 is connected to, and/or in communication with, the rotatable support 201, the DI water nozzle 220, the holder 230, the displacement sensor 240, the camera 250, etc., as shown in FIG. 7, and controls the movement of the clamped analytical semiconductor samples 10 to the upper surface of the polishing plate 210 in accordance with command information, the rotation of the rotatable support 201 with a predetermined (and/or otherwise determined) number of rotation, and the discharge of the DI water through the DI water nozzle 220 to process grinding of the analytical semiconductor samples 10. The controller 260 may also be referred to as an electronic controller, and may include processing circuitry, such as hardware, software, or a combination of hardware and software. For example, the processing circuitry more specifically may be and/or include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), electrical components (such as at least one of transistors, resistors, capacitors, logic gates (including at least one of AND gates, OR gates, NOR gates, NAND gates, NOT gates, XOR gates, etc.), and/or the like), etc.

Additionally, the controller 260 may check the state of the analytical semiconductor samples 10 are ground on the upper surface of the polishing plate 210, through the camera 250 in real time, and may control the display of an image obtained by capturing the surface of the ground analytical semiconductor samples 10 to the user.

In the apparatus for manufacturing analytical semiconductor samples according to the second embodiment of the present disclosure configured as above, the analytical semiconductor samples 10 may be clamped in a vertical direction using the first clamp terminal 239 and the second clamp terminal 238, and the viewing surface may be manufactured at a side or edge portion of the analytical semiconductor samples 10 by using the polishing plate 210 and the DI water.

Particularly, the apparatus for manufacturing analytical semiconductor samples according to the second embodiment of the present disclosure may manufacture the viewing surface of the side or edge portion of the analytical semiconductor samples 10 by discharging the DI water through the DI water nozzle 220 differently from the conventional CMP method using less environmentally friendly chemicals. As such, the apparatus for manufacturing analytical semiconductor samples according to the first embodiment of the present disclosure may form the viewing surface through a mechanism that is environment-friendly and which has a large area that may be manufactured to minimize a feedback time.

Figure 12:
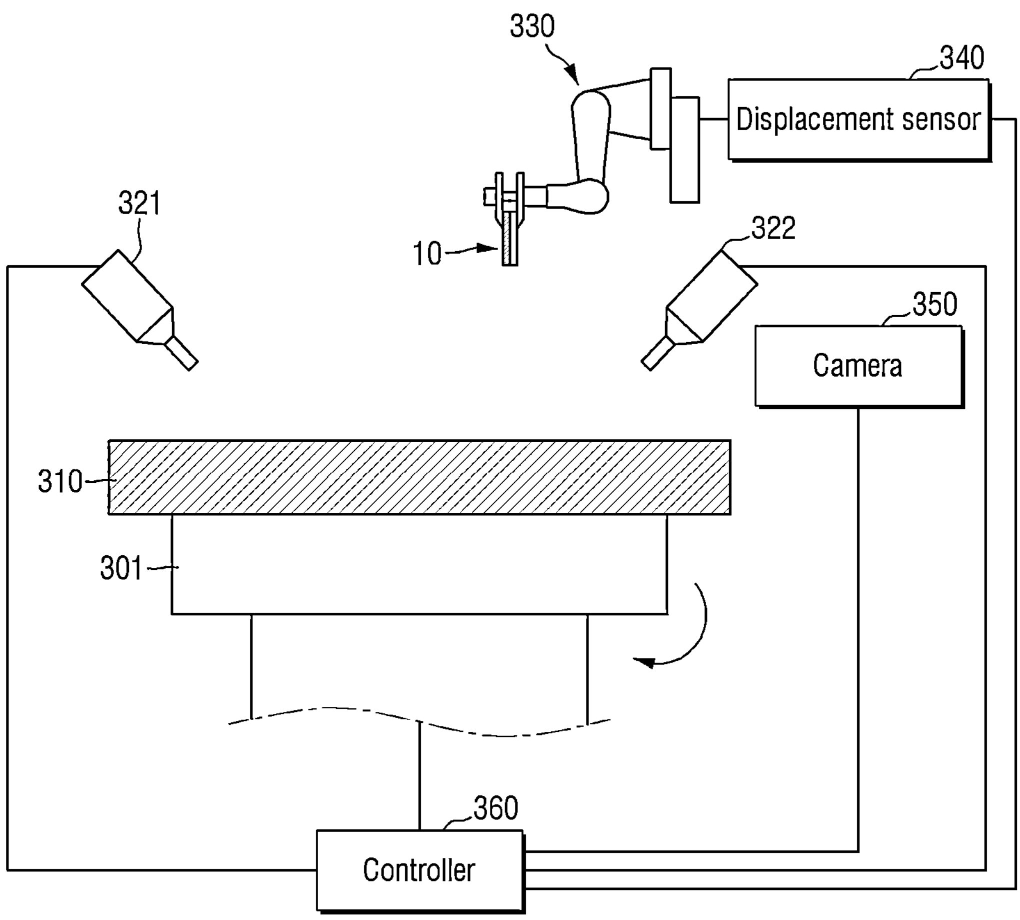
FIG. 12 is a schematic view illustrating an apparatus for manufacturing analytical semiconductor samples according to the third embodiment of the present disclosure.

Hereinafter, an apparatus for manufacturing analytical semiconductor samples according to the third embodiment of the present disclosure will be described with reference to FIG. 12. FIG. 12 is a schematic view illustrating an apparatus for manufacturing analytical semiconductor samples according to the third embodiment of the present disclosure.

As shown in FIG. 12, the apparatus for manufacturing analytical semiconductor samples according to the third embodiment of the present disclosure includes a rotatable support 301 formed of a metal material, having a disk-shaped upper surface, a polishing plate 310 mounted on an upper surface of the rotatable support 301, a first DI water nozzle 321 positioned at one side above the polishing plate 310, a second DI water nozzle 322 positioned at the other side above the polishing plate 310, a holder 330 holding analytical semiconductor samples 10 and positioned above the polishing plate 310, a displacement sensor 340 provided above the holder 330, a camera 350 provided above the polishing plate 310 in proximity to the holder 330, and a controller 360 connected to (and/or in communication with) the rotatable support 301, the first DI water nozzle 321, the second DI water nozzle 322, the holder 330, the displacement sensor 340, and the camera 350.

The apparatus for manufacturing analytical semiconductor samples according to the third embodiment of the present disclosure has a structure similar to that of the apparatus for manufacturing analytical semiconductor samples according to the second embodiment of the present disclosure, however, the example is not limited thereto. For example, it should be understood that the following description may also be allied to, e.g., the first embodiment illustrated in FIG. 1. For example, it should be understood that the following description may also be allied to, e.g., the first embodiment illustrated in FIG. 1. As shown in FIG. 12, the first DI water nozzle 321 and the second DI water nozzle 322 are positioned above the polishing plate 310 while facing each other unlike the second embodiment. According to at least some examples, the rotatable support 301, the polishing plate 310, the first DI water nozzle 321, the holder 330, the displacement sensor 340, the camera 350, and the controller 360 may be the same as, and/or substantially similar to the rotatable support 101 and 201, the polishing plate 110 and 210, the first DI water nozzle 120 and 220, the holder 130 and 230, the displacement sensor 140 and 240, the camera 150 and 250, and the controller 160 and 260 of FIGS. 1 and 7, respectively. Therefore, the description of the apparatus for manufacturing analytical semiconductor samples according to the third embodiment of the present disclosure, which is the same as that according to the second embodiment, will be omitted for brevity.

In the apparatus for manufacturing analytical semiconductor samples according to the third embodiment of the present disclosure, the second DI water nozzle 322 is positioned above the polishing plate 310 to correspond to the first DI water nozzle 321, and DI water is discharged to the analytical semiconductor samples 10 in a process in which the analytical semiconductor samples 10 clamped in the holder 330 are ground in contact with an upper surface of the polishing plate 310, whereby grinding of the analytical semiconductor samples 10 may be more easily performed.

For example, the second DI water nozzle 322 directly discharges the DI water to the analytical semiconductor samples 10 to push particles of the analytical semiconductor samples 10, which occur during the grinding process of the analytical semiconductor samples 10, outside from the upper surface of the polishing plate 310, so that the particles may be immediately removed.

Therefore, in the apparatus for manufacturing analytical semiconductor samples according to the third embodiment of the present disclosure, the first DI water nozzle 321 performs a lubricating operation in the process of grinding the DI water discharged to the upper surface of the polishing plate 310, and the second DI water nozzle 322 directly discharges the DI water to the analytical semiconductor samples 10 to remove particles, whereby a viewing surface of the analytical semiconductor samples 10 may be more clearly acquired without influence due to the particles. According to at least some examples, the position of the nozzles of the first and/or second DI water nozzle 321 and/or 322 may be adjusted, e.g., by the controller 360, to adjust the point of contact for the DI water emitted therefrom.

Figure 13:
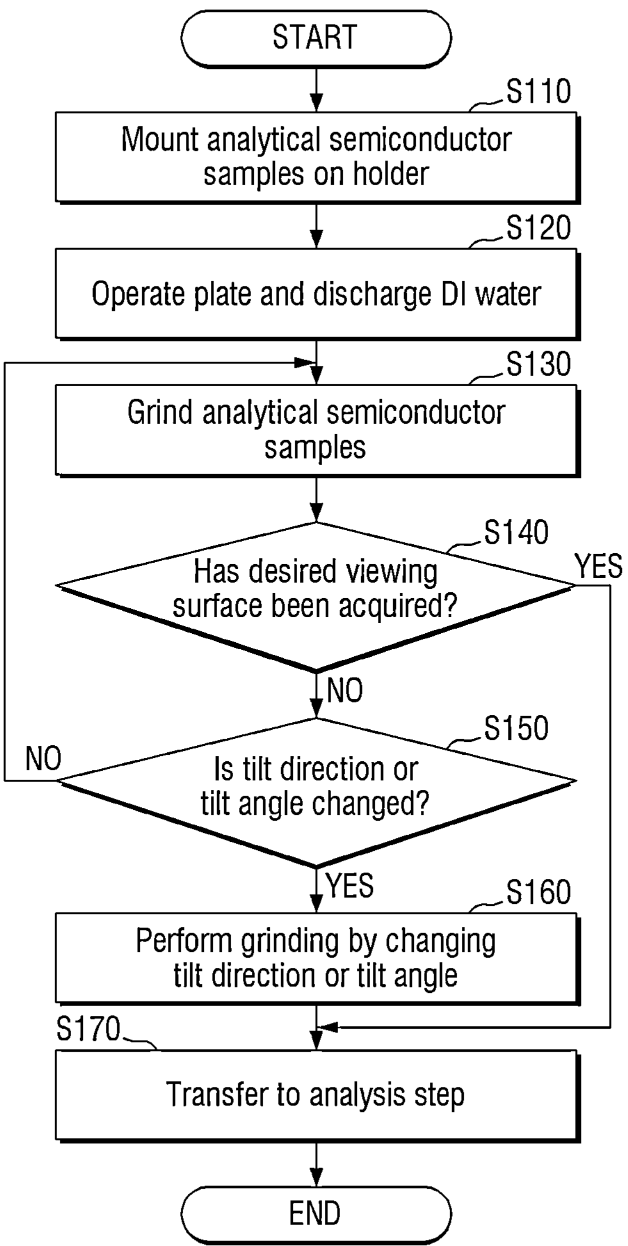
FIG. 13 is a flow chart illustrating a method for manufacturing analytical semiconductor samples by using an apparatus for manufacturing analytical semiconductor samples according to the fourth embodiment of the present disclosure.
Figure 14:
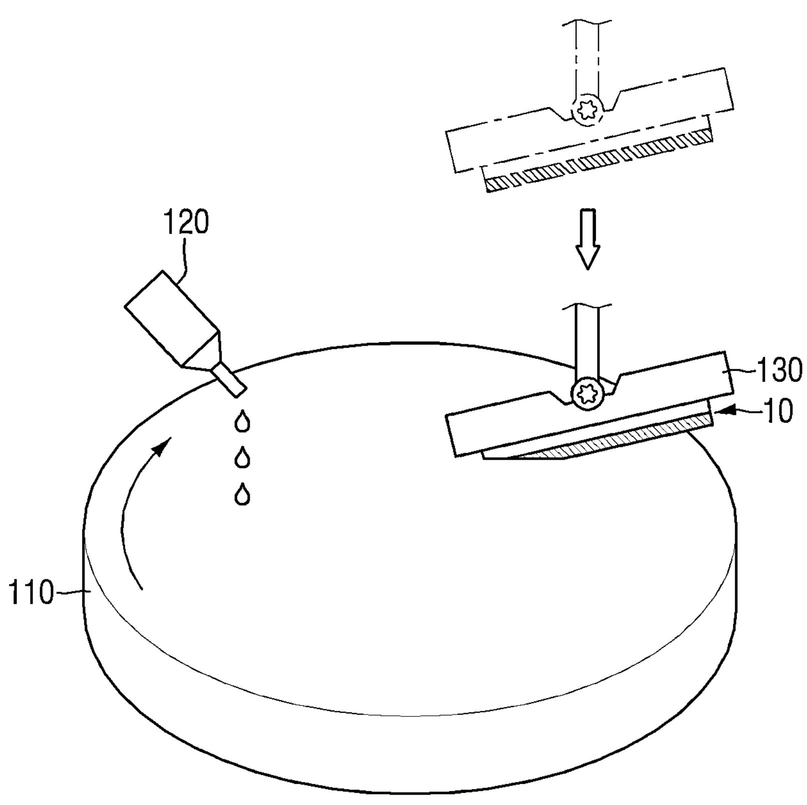
FIG. 14 is an example view illustrating a method for manufacturing analytical semiconductor samples by using an apparatus for manufacturing analytical semiconductor samples according to the fourth embodiment of the present disclosure.

Hereinafter, a method for manufacturing analytical semiconductor samples, according to the fourth embodiment of the present disclosure, by using an apparatus for manufacturing analytical semiconductor samples will be described with reference to FIGS. 13 and 14. FIG. 13 is a flow chart illustrating a method for manufacturing analytical semiconductor samples by using an apparatus for manufacturing analytical semiconductor samples according to the fourth embodiment of the present disclosure, and FIG. 14 is an example view illustrating a method for manufacturing analytical semiconductor samples by using an apparatus for manufacturing analytical semiconductor samples according to the fourth embodiment of the present disclosure.

In the method for manufacturing analytical semiconductor samples by using the apparatus for manufacturing analytical semiconductor samples according to the fourth embodiment of the present disclosure, a process of manufacturing a viewing surface of the analytical semiconductor samples 10 will be described using the apparatus for manufacturing analytical semiconductor samples according to the first embodiment of the present disclosure as an example; however the examples are not limited thereto. For example, the viewing surface of the analytical semiconductor samples 10 may be manufactured using the apparatus for manufacturing analytical semiconductor samples according to the second embodiment of the present disclosure and/or the apparatus for manufacturing analytical semiconductor samples according to the third embodiment of the present disclosure.

First, in the method for manufacturing analytical semiconductor samples according to the fourth embodiment of the present disclosure, the analytical semiconductor samples 10 are prepared to be mounted on the holder 130 (S110).

For example, in a state that the analytical semiconductor samples 10 are mounted on a rectangular groove 131-2 of the holder housing 131 and are supported by the push member 131-5, the controller 160 may maintain an adsorbed state by initiating the vacuum-adsorbing of the analytical semiconductor sample 10 through the vacuum hole 131-1 communicated with the vacuum suction pipe 134.

The apparatus for manufacturing analytical semiconductor samples according to the second embodiment of the present disclosure and/or the apparatus for manufacturing analytical semiconductor samples according to the third embodiment of the present disclosure may maintain a state that the analytical semiconductor samples 10 are clamped between the first clamp terminal 239 and the second clamp terminal 238.

After the analytical semiconductor samples 10 are mounted on the holder 130, the controller 160 operates the rotatable support 101 to grind the analytical semiconductor samples 10, rotates the polishing plate 110 a predetermined (and/or otherwise determined) number of rotation and discharges the DI water to the upper surface of the polishing plate 110 through the DI water nozzle 120 (S120). For example, in at least some examples, the controller 160 may set a rotation per second and a duration for the polishing plate 110 and/or include a counter for the number of rotations.

As the DI water is discharged to the upper surface of the polishing plate 110, the controller 160 controls the holder 130 to move the analytical semiconductor samples 10 to contact the upper surface of the polishing plate 110, thereby grinding the analytical semiconductor samples 10 (S130).

The degree of grinding Mr for grinding the analytical semiconductor samples 10 may be set by the following Equation 1.

$$Mr \propto \mu \times F \times A^{-1} \times v \times t \times R_a \times R_z \quad \text{[Equation 1]}$$

In Equation 1, the degree of grinding Mr may be set in accordance with a frictional coefficient μ of the polishing plate 110, a force F of the holder 130 pressing the analytical semiconductor samples 10 toward the upper surface of the polishing plate 110, a surface area A of the viewing surface of the analytical semiconductor samples 10, a speed v of rotation of the polishing plate 110, a grinding time t, a surface roughness Ra of the polishing plate 110, and a waviness Rz of the polishing plate 110.

After grinding of the analytical semiconductor samples 10 is performed, the controller 160 receives a viewing surface image of the analytical semiconductor samples 10 ground through the camera 150, and the controller 160 may display the received viewing surface image to a user.

At this time, the controller 160 receives and/or determines command information, e.g., from the user, whether a desired viewing surface of the analytical semiconductor samples 10 has been acquired with respect to the viewing surface image of the analytical semiconductor samples 10 that are ground (S140).

When the command information indicates that the desired viewing surface of the analytical semiconductor samples 10 has been acquired, the controller 160 transfers the analytical semiconductor samples 10 to an analysis step for analyzing the analytical semiconductor samples 10 (S170).

On the other hand, when the controller 160 receives command information indicates that the desired viewing surface of the analytical semiconductor samples 10 has not been acquired, the controller 160 receives and/or determines command information on whether a tilt direction or a tilt angle of the analytical semiconductor samples 10 is to be changed (S150) and/or whether the griding of the analytical semiconductor samples should be repeated.

When it is determined that there is no command information for changing the tilt direction or the tilt angle of the analytical semiconductor samples 10, the controller 160 continues to perform grinding of the analytical semiconductor samples 10 using the polishing plate 110 and the legacy configuration.

For example, when it is determined that there is command information for changing the tilt direction or the tilt angle of the analytical semiconductor samples 10, the controller 160 changes the tilt direction or the tilt angle of the analytical semiconductor samples 10 by receiving information of the tilt direction or the tilt angle, which is input in accordance with the command information of the user for changing the tilt direction or the tilt angle of the analytical semiconductor samples 10, thereby performing grinding (S160) at the new tilt direction and/or angle.

For example, after grinding of the analytical semiconductor samples 10 mounted on the lower surface of the holder housing 131 is performed in a horizontal direction, the controller 160 may control the motor 133 in accordance with the command information of the user for changing the tilt direction or the tilt angle, thereby changing the tilt direction or the tilt angle of the holder housing 131.

Therefore, as shown in FIG. 14, the analytical semiconductor samples 10 mounted on the lower surface of the holder housing 131 are tilted at a predetermined (and/or otherwise determined) angle in the tilt direction and are in contact with the upper surface of the polishing plate 110 under the control of the controller 160, so that edge portions of the analytical semiconductor samples 10 may be ground.

According to at least some examples, after performing grinding (S160) at the new tilt direction and/or angle, a determination of whether a desired viewing surface of the analytical semiconductor samples 10 has been acquired with respect to the viewing surface image of the analytical semiconductor samples 10, and operations S130, S140, S150 and/or S160 may be repeated until the desired viewing surface is obtained and/or until the analytical semiconductor samples 10 is determined to be not viable.

Even in the apparatus for manufacturing analytical semiconductor samples according to the second embodiment of the present disclosure and the apparatus for manufacturing analytical semiconductor samples according to the third embodiment of the present disclosure, in a state that the analytical semiconductor samples 10 are clamped between the first clamp terminal 239 and the second clamp terminal 238, the rotary body 232 and the plurality of links 233, 234 and 235 are operated under the control of the controller 260 to tilt the analytical semiconductor samples 10 at a predetermined (and/or otherwise determined) angle so that the analytical semiconductor samples 10 are in contact with the upper surface of the polishing plate 210, whereby the analytical semiconductor samples 10 may be ground.

At this time, since the surface hardness of the polishing plate 110 is maintained at a hard surface during the grinding process due to characteristics having a range of 6.5 to 9.5 as a Mohs hardness, a conventional edge rounding phenomenon in which the edge portions of the analytical semiconductor samples are rounded may be prevented from occurring.

As a result, a flat viewing surface is acquired, and then the controller 160 transfers the analytical semiconductor samples 10 to an analysis step for analyzing the viewing surface of the ground analytical semiconductor samples 10 (S170).

In the method for manufacturing analytical semiconductor samples according to the fourth embodiment of the present disclosure, which includes the above-described process, the tilt direction or the tilt angle of the analytical semiconductor samples 10 may be changed so that viewing surfaces of various angles may be manufactured in a horizontal direction or a vertical direction.

Also, in the method for manufacturing analytical semiconductor samples according to the fourth embodiment of the present disclosure, since the DI water is discharged differently from the conventional CMP method (using less environmentally friendly chemicals) to manufacture the viewing surface of the analytical semiconductor samples 10. Also, since the viewing surface of the analytical semiconductor samples 10 may be manufactured to be wider than that of the conventional FIB method, a viewing surface having a large area may be manufactured to minimize a feedback time.

Therefore, the result of acquiring the viewing surface of the analytical semiconductor samples 10 using the conventional CMP method using chemicals and the result of acquiring the viewing surface of the analytical semiconductor samples according to the fourth embodiment of the present disclosure will be compared with each other as follows.

Comparative Example

In the conventional CMP method according to the comparative example, a polishing pad having a surface roughness of 0.1 μm operates at a number of rotation of 120 rotations per minute (rpm), and the upper surface of the analytical semiconductor samples 10 is ground for ten minutes while a CMP slurry including silica, a dispersant, an antifoaming agent, etc. is being discharged.

Example Embodiment

In the example embodiment, the upper surface of the analytical semiconductor samples 10 is ground using the apparatus for manufacturing analytical semiconductor samples according to the first embodiment of the present disclosure. The polishing plate having a surface roughness of 0.1 μm operates at a number of rotation of 120 rpm, and the upper surface of the analytical semiconductor samples 10 is ground while the DI water is being discharged to the upper surface of the polishing pate 110 through the DI water nozzle 120.

Figure 15:
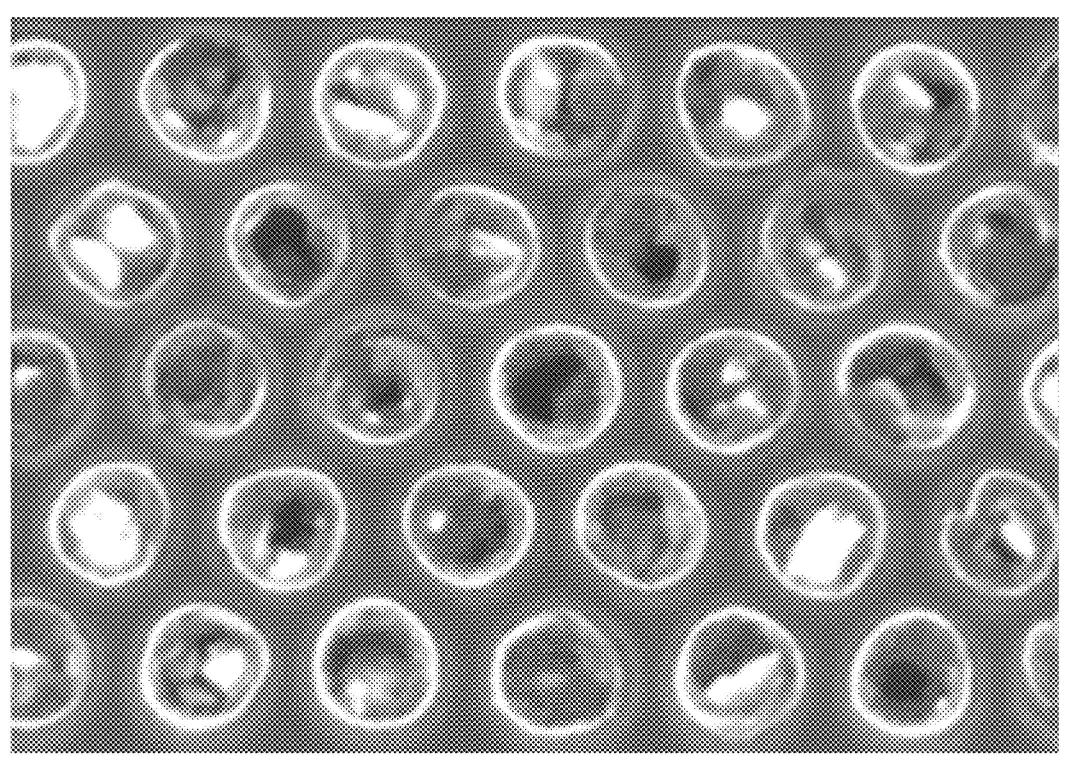
FIG. 15 is an SEM image of analytical semiconductor samples detected in accordance with a conventional comparative example.
Figure 16:
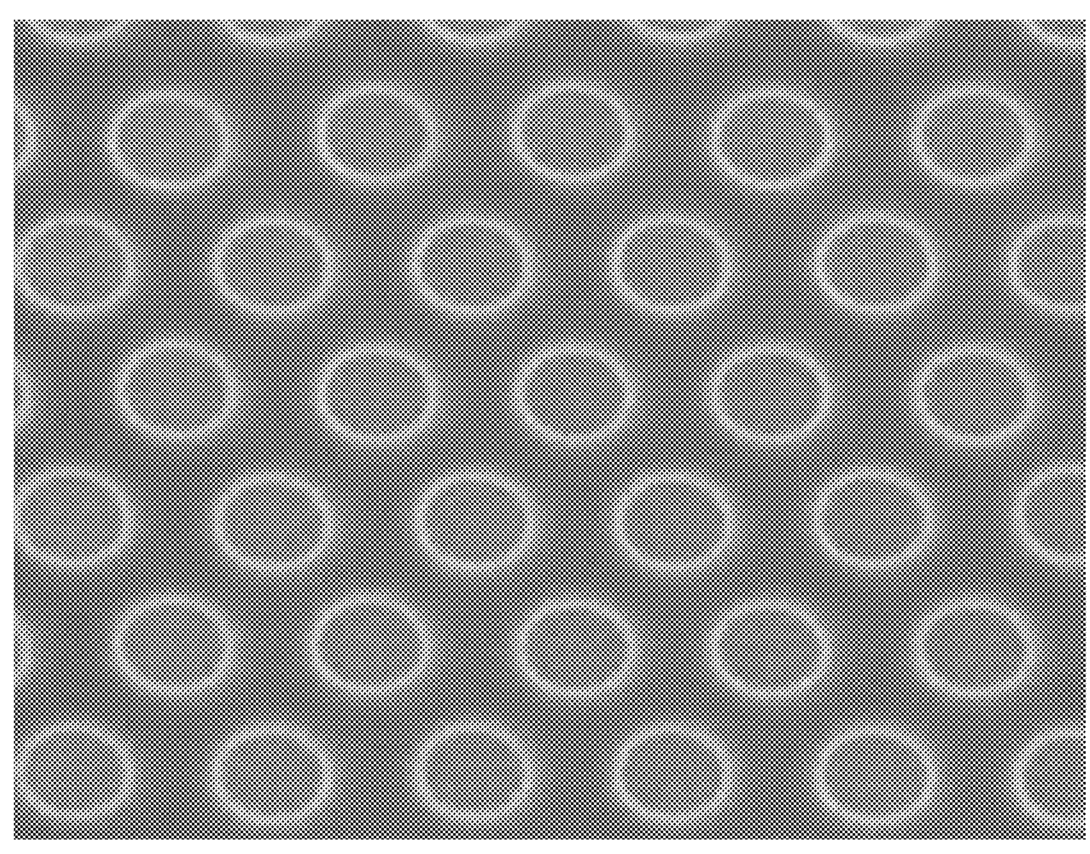
FIG. 16 is an SEM image of analytical semiconductor samples detected in accordance with a method apparatus for manufacturing analytical semiconductor samples by using an apparatus for manufacturing analytical semiconductor samples according to some embodiments of the present disclosure.

As a result of the comparative example and the embodiment, the result of the comparative example is detected as an SEM image shown in FIG. 15, and the result of the example embodiment is detected as an SEM image shown in FIG. 16. Therefore, it is noted from the comparative example that the CMP slurry including silica, a dispersant, an antifoaming agent, etc. remains on the viewing surface of the analytical semiconductor samples, whereas it is noted from the embodiment that a relatively clear viewing surface may be acquired as the DI water is used.

In the comparative example, a cleaning process should be performed to remove the remaining CMP slurry, and a process of treating the collected CMP slurry adversely affects the environment.

On the other hand, in the embodiment, since a clear viewing surface may be acquired using the DI water, a cleaning process is not required and the DI water does not affect the environment so that the viewing surface is environment-friendly.

Although the embodiments of the present disclosure have been described with reference to the accompanying drawings, it will be apparent to those skilled in the art that the present disclosure can be manufactured in various forms without being limited to the above-described embodiments and can be embodied in other specific forms without departing from the spirit and essential characteristics of the present disclosure. Thus, the above embodiments are to be considered in all respects as illustrative and not restrictive.

What is claimed is:

1. A method for preparing analytical semiconductor samples, the method comprising:

mounting the analytical semiconductor samples to a holder;

rotating, through a rotatable support, a polishing plate;

discharging deionized (DI) water to an upper surface of the polishing plate through a DI water nozzle;

grinding the analytical semiconductor samples with the upper surface of the polishing plate during the rotating;

determining whether a desired viewing surface of the analytical semiconductor samples, with respect to a viewing surface image of the ground analytical semiconductor samples, has been acquired after the grinding of the analytical semiconductor samples;

determining a change of at least one of a tilt direction or a tilt angle based on a determination that the desired viewing surface of the analytical semiconductor samples has not been acquired;

grinding the analytical semiconductor samples using the changed at least one of the tilt direction or the tilt angle; and transferring the analytical semiconductor samples to analyze the viewing surface of the ground analytical semiconductor samples based on a determination that the desired viewing surface of the analytical semiconductor samples has been acquired.

2. The method of claim 1, wherein the mounting the analytical semiconductor samples includes mounting the analytical semiconductor samples in a rectangular groove in a lower portion the holder, supporting the analytical semiconductor samples in the rectangular groove using a push member; and maintaining a vacuum-adsorbed state of the analytical semiconductor samples through a vacuum hole communicating with a vacuum suction pipe.

3. The method of claim 1, wherein the mounting the analytical semiconductor samples includes maintaining a clamped state of the analytical semiconductor samples between a first clamp terminal and a second clamp terminal.

4. The method of claim 1, wherein, during the grinding of the analytical semiconductor samples, a grinding degree of the analytical semiconductor samples is set based on a frictional coefficient of the polishing plate, a force of the holder pressing the analytical semiconductor samples toward the upper surface of the polishing plate, a surface area of the viewing surface of the analytical semiconductor samples, a speed of rotation of the polishing plate, a grinding time, a surface roughness of the polishing plate, and a waviness of the polishing plate.

5. The method of claim 1, wherein the grinding using the changed at least one of the tilt direction or the tilt angle includes controlling a motor, which is provided on an upper portion of a holder housing of the holder, such that the at least one of the tilt direction or the tilt angle is changed.

6. The method of claim 1, wherein the grinding using the changed at least one of the tilt direction or the tilt angle includes controlling a plurality of links to tilt the analytical semiconductor samples at an angle such that the analytical semiconductor samples are in contact with the upper surface of the polishing plate.

* * * * *